Nov. 12, 1946.   J. L. RICKETTS   2,411,056
GRAIN HOUSING WAGON BODY
Filed April 25, 1945   3 Sheets-Sheet 2
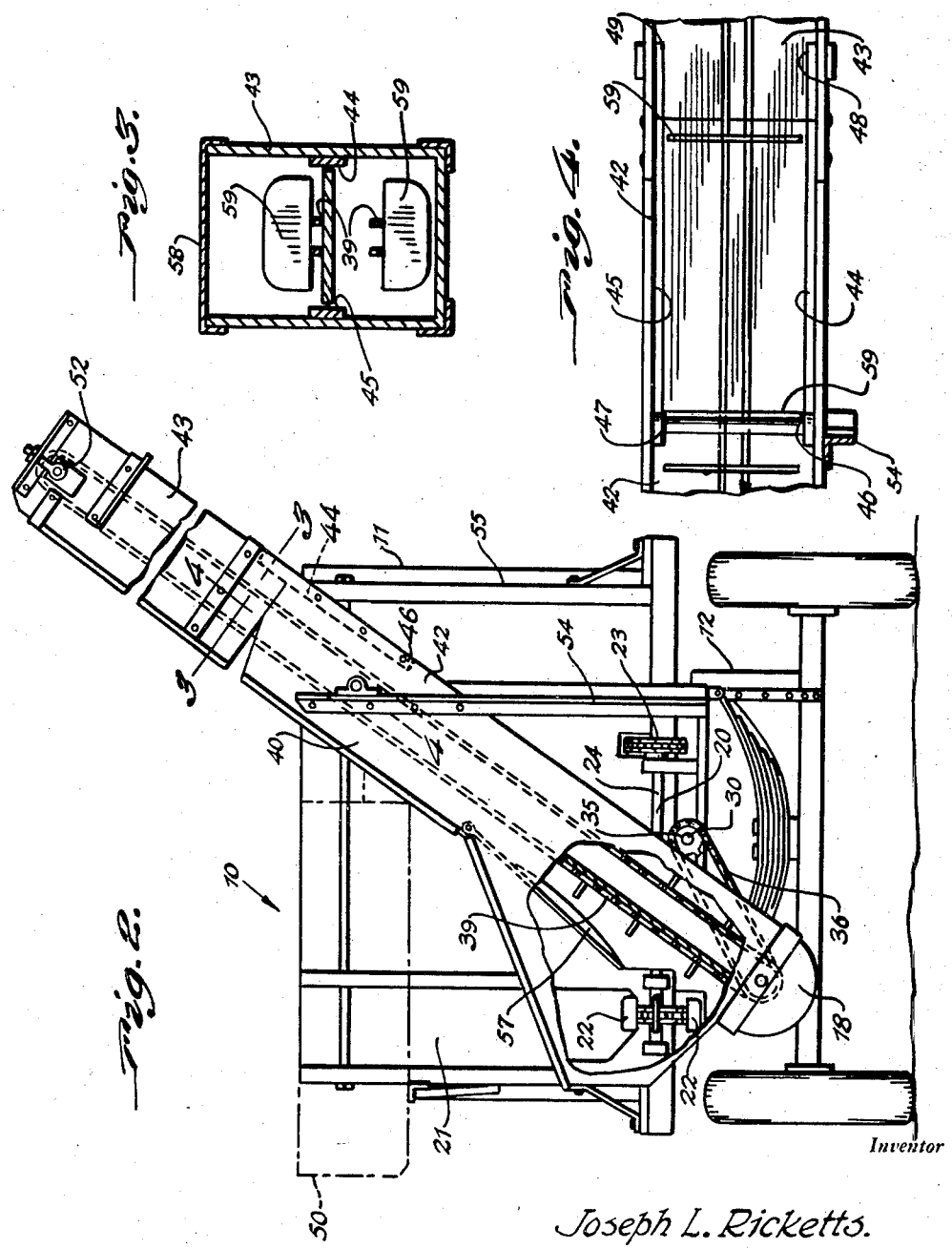
Inventor
Joseph L. Ricketts.
By Clarence A. O'Brien
and Harvey B. Jacobson
Attorneys

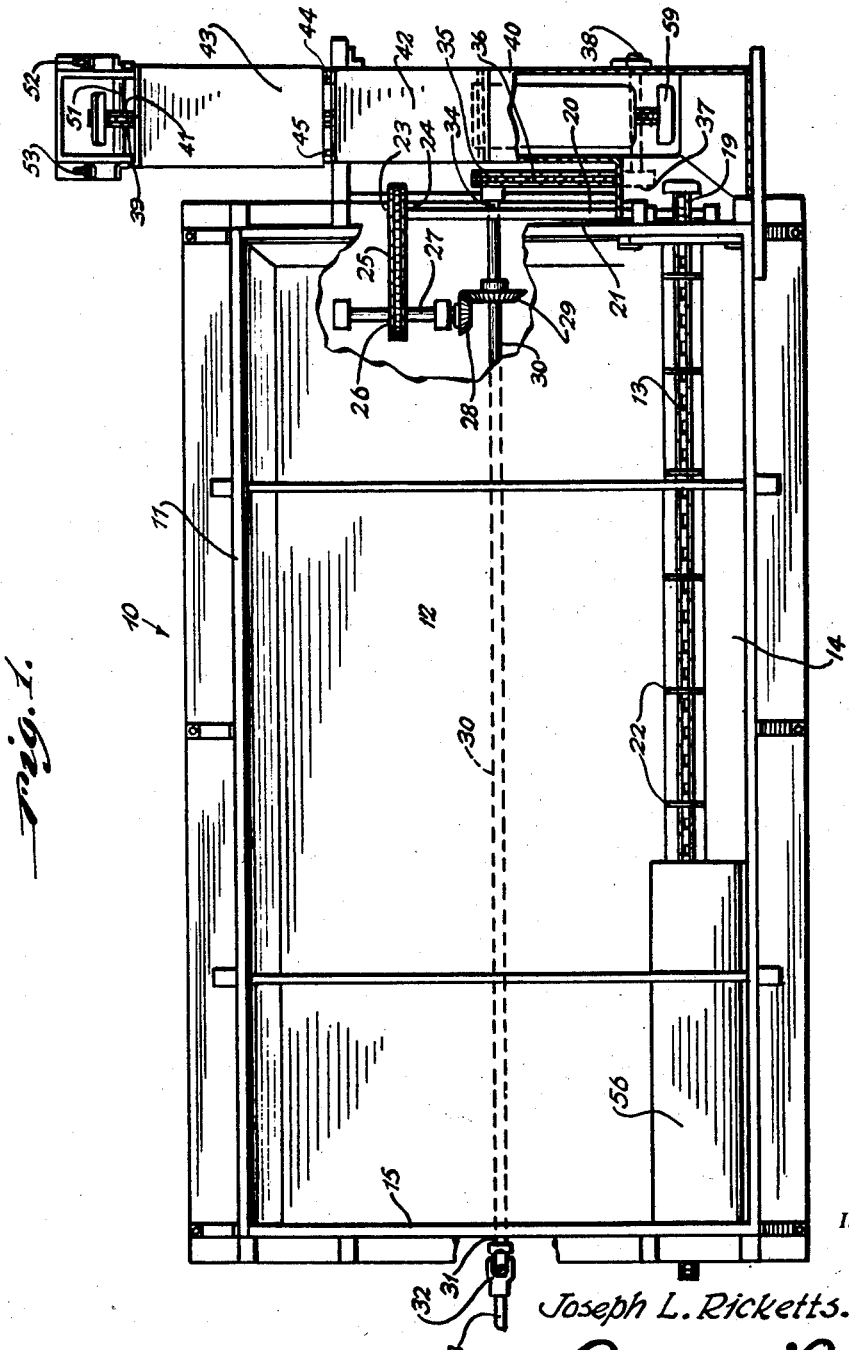

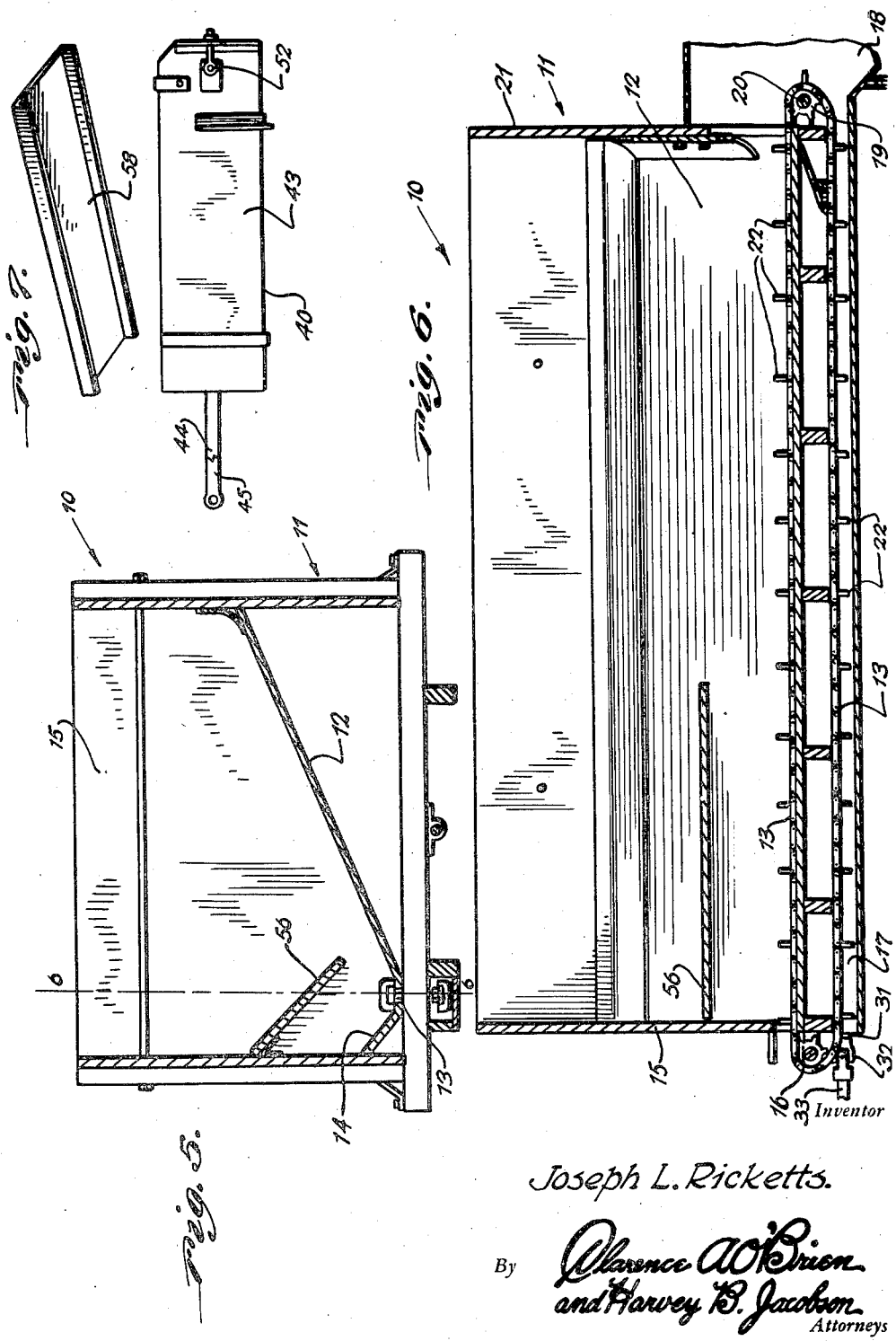

Patented Nov. 12, 1946

2,411,056

UNITED STATES PATENT OFFICE 2,411,056

GRAIN HOUSING WAGON BODY

Joseph L. Ricketts, Frankfort, Ind.

Application April 25, 1945, Serial No. 590,173

2 Claims. (Cl. 214—83)

This invention relates to agricultural machinery and has for an object to provide a corn or other grain transporting and housing body requiring no manual assistance.

Another object of the invention is to provide a combined wagon box and elevator.

A further object of the invention is to provide a combined wagon box and elevator, the box having a self-feeder to the elevator.

Another object of the invention is to provide a folding endless conveyor elevator.

A still further object of the invention is to provide a truck body having an endless grain drag and mechanical means for feeding the grain thereto.

Other features and advantages will become more readily apparent from the following description and the accompanying illustrative drawings in which:

Figure 1 is a top plan view of my combined truck body and elevator,

Figure 2 is a rear end view thereof partly broken away,

Figure 3 is a sectional view taken on line 3—3 of Figure 2,

Figure 4 is a detail plan view of a portion of an elevator,

Figure 5 is a transverse sectional view of a truck body,

Figure 6 is a longitudinal sectional view on line 6—6 thereof, and

Figure 7 indicates detail views of an upper part of an elevator.

In the illustrative drawings accompanying and forming a part of the application and in the following specification like reference characters refer to like parts throughout and in which 10 indicates my combined truck body and elevator. The device consists of a grain box or body 11, adapted for use upon any truck running gear 12, as the body self contains all of the mechanism necessary for unloading grain directly into a corn crib (permanent or portable) or grainery. In the first place, the floor 12, of the body is inclined to such an extent that material contained thereon will automatically slide down to an endless drag chain 13, which runs throughout the length of said body. On the opposite side of the drag chain is another inclined floor section 14. The drag chain extends through the front wall 15, of the body, runs over an idler sprocket wheel 16, and then back through a longitudinal boxing 17, which extends entirely throughout the length of said body and into the hopper 18, which will again be referred to. The under portion of the chain 13, follows forwardly said boxing and is trained over a drive sprocket 19, keyed on a shaft 20, mounted beyond the rear wall 21, of the body 11. The chain 13, is provided with a series of suitably spaced apart drag members 22.

The shaft 20, is provided with a fixed sprocket 23 on its end 24 over which a sprocket chain 25 is trained, which chain is driven by a sprocket wheel 26 keyed on shaft 27, hung from under the wagon body. This latter shaft is provided with a bevel gear 28, which is meshed with a similar gear 29, keyed upon a longitudinal shaft 30 provided on its forward end 31, with a universal joint 32, connected to a power take-off shaft 33 from a tractor to which the truck 12 is hitched.

The opposite end 34, of the shaft 30, has fixed thereon a sprocket wheel 35, which drives sprocket chain 36, operating a sprocket wheel 37, on a shaft 38, upon which is fixed a sprocket wheel which drives the endless conveyor 39, operating in the upwardly inclined elevator shaft 40, and trained over idler sprocket 41. The member 40 is formed in two sections 42 and 43, hingedly connected by pilot arms 44 and 45, pivoted to member 42 at 46 and 47, and to member 43 at 48 and 49, whereby the member 43 may be swung down upon the tail end 21 of the wagon body as indicated in dotted lines 50 on Figure 2 of the drawings. Due to this arrangement the truck 12, with body 11, can be driven into the driveway of any ordinary corn crib through which a truck can pass, and the member 43 then swung up into any doorway in the crib.

As before stated, the drag chain 13 extends into the hopper 18 of the elevator shaft 40, in consequence of which it would be only necessary to start the tractor motor whereupon a truck load of sixty bushels of corn may be elevated into a corn crib within eight or ten minutes as I have proven beyond a doubt, having unloaded six thousand bushels during the past season into my own cribs. The sprocket wheel 41 is mounted on a shaft 51, which is hung in bolt eye bearings 52 and 53 for tightening the chain 39 when necessary. Angle irons 54 and 55 are provided to support the shaft 40 in its upright position. A guard member 56 is mounted above the forward portion of the drag chain, and a weighted float 57 is provided in the lower end of the elevator shaft; 58 is a cover for the member 43 and 59 are drag members carried by the member 39.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to in actual practice, if desired.

Having now described my invention that which I claim as new and desire to procure by Letters Patent is:

1. The described device comprising a wagon body the bottom wall of which uniformly inclines to one side thereof, a drag operating along said side within the body, a boxed in elevator having a grain receiving sump into which the drag empties, said elevator being inclined transversely of said body, said elevator being in two sections one section of which folds down upon the other section, said elevator being fixed to the rear end of said body, and means at the front of the body through which the drag and elevator are operated.

2. The described device comprising a wagon body the bottom wall of which uniformly inclines to one side thereof, a drag operating along said side within the body, a boxed in elevator having a grain receiving sump into which the drag empties, said elevator being inclined transversely of said body, said elevator being in two sections one section of which folds down upon the other section, said elevator being fixed to the rear end of said body.

JOSEPH L. RICKETTS.